Figure 1:
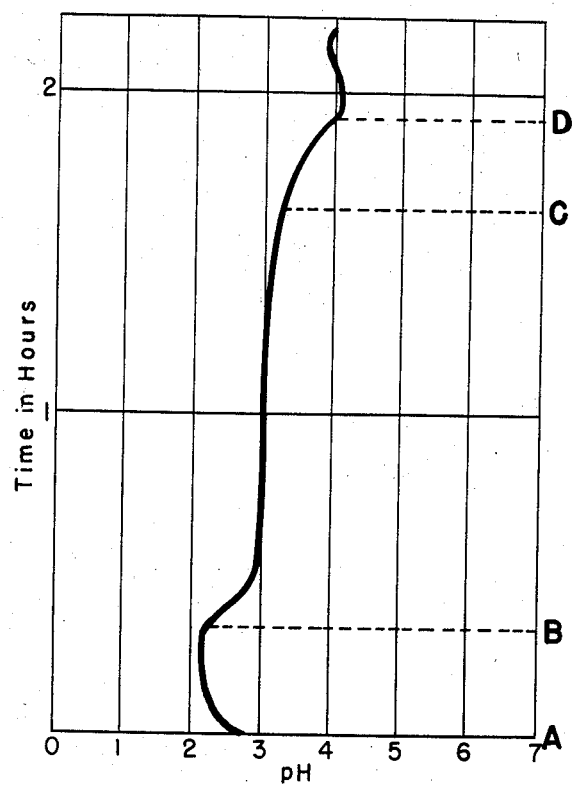

July 8, 1958 F. REYNAUD ET AL 2,842,427
PROCESS OF SEPARATING NICKEL AND COBALT
Filed April 19, 1956

INVENTORS.
Francis Reynaud
Georges Terraz
BY Webb, Mackey & Burden
THEIR ATTORNEYS

United States Patent Office 2,842,427
Patented July 8, 1958

2,842,427
PROCESS OF SEPARATING NICKEL AND COBALT

Francis Reynaud and Georges Terraz, Pombliere, France, assignors to Societe d'Electro-Chimie, d'Electro-Metallurgie et des Acieries Electriques d'Ugine, Paris, France, a corporation of France Application April 19, 1956, Serial No. 579,177

Claims priority, application France April 23, 1955

1 Claim. (Cl. 23—183)

It is known that the processes for separating nickel and cobalt from their solutions which use chlorine or alkaline and/or alkaline earth hypochlorites as separating agents are based on the preferential oxidation of the cobalt salts, particularly chlorides and sulphates, in comparison with the nickel salts. The acid released in the course of the reaction is eliminated by a neutralizing agent.

It is also known that the precipitated hydroxides are generally of the type $Me_2O_3 \cdot nH_2O$, according to the following reaction, for example:

(1) 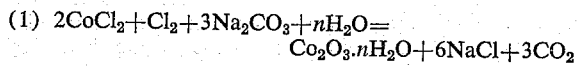
$$2CoCl_2 + Cl_2 + 3Na_2CO_3 + nH_2O = Co_2O_3 \cdot nH_2O + 6NaCl + 3CO_2$$

The precipitation of the cobaltic hydroxide is due to the concomitant action of the chlorine which acts as an oxidizing agent, and of the carbonate which acts as a neutralizing agent of the acid formed in the course of the reaction. But the separation is generally incomplete and the precipitated cobaltic hydroxide contains substantial amounts of nickel, generally 2 to 5 parts or more of nickel for every 100 parts of cobalt.

Another method for separating cobalt and nickel depends upon the action of the nickelic hydroxide on the mixed solution of cobalt and nickel. But, in this case, also, the separation is not complete.

In order to obtain a satisfactory separation, the impure cobaltic hydroxide thus precipitated must be subjected to a further treatment for the separation of the coprecipitated nickel. One of the following processes accomplishes this result: resuspending the precipitate of impure cobaltic hydroxide in a new solution containing a cobalt salt; or resuspending the impure cobaltic hydroxide in water and acidifying, with or without a reducing agent, in order to promote the dissolution of a part of the cobalt which is thus exchanged with the nickel; or using the prolonged action of chlorine on the impure cobaltic hydroxide in suspension in an aqueous medium by which the action the chlorine promotes the redissolution of a greater part of the nickel and a part of the cobalt passes into solution again. However, none of these processes yields a very large separation of the cobalt in only one operation.

The present invention is a process of separating cobalt and nickel from solutions containing mixtures of their salts by means of only one operation, particularly when the salts are in the form of mixed chlorides and/or sulphates.

Figure 2:
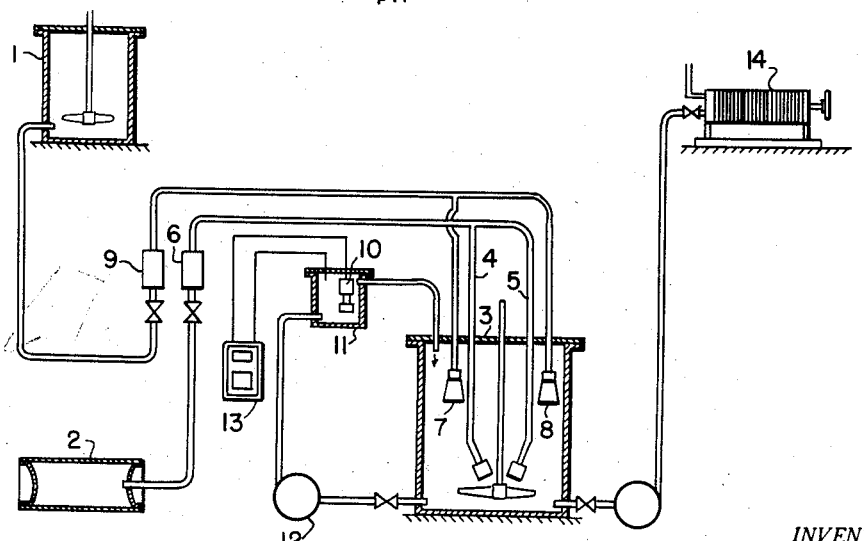

In the accompanying drawings which illustrate a preferred embodiment of the invention, Figure 1 is a typical curve representing the pH of the solution during the course of the treatment according to the present invention, the abscissas designating pH and the ordinates designating time measured in hours; and Figure 2 is a diagrammatic illustration of an apparatus suitable for carrying out the process.

A process according to the present invention consists in adding gaseous chlorine and one or several alkali and/or alkaline earth metal carbonates simultaneously to the solution at room temperature and regulating the introduction of these elements into the solution so that the pH of the solution is maintained at values at which cobalt hydroxide precipitates but at which nickel hydroxides cannot precipitate until substantially all of the cobalt has been precipitated. The cobaltic hydroxide, which is substantially free of nickel, is separated rapidly at the end of this operation so that it does not absorb nickel by a prolonged contact with the saline solution of nickel. The cobaltic hydroxide is then washed immediately.

The precipitate formed, which is called cobaltic hydroxide herein, contains chiefly the cobaltic hydroxide shown in equation (1) above. The precipitate may also contain small amounts of other oxides of cobalt, such as $CoO_2$ or $Co_3O_4$, which are normally hydrated.

The addition of carbonates can be in any known form, either in a dissolved state, in suspension, or in a divided solid state, so long as the addition can be proportioned in a very exact manner and provides a homogeneous mixture with the solution to which it is added.

The present process comprises, as a rule, the following steps. The solution containing the salts of cobalt and nickel is introduced into a reaction tank having sufficient volume to allow the further addition of the carbonate. Chlorine is diffused into the solution at a low rate of input to lower the pH of the solution to a value near 2 (part AB of the diagram). The measurement of the pH, which is preferably measured by a glass electrode illustrated in Figure 1, is continuous during the process. The rate of the chlorine input is progressively increased and the addition of the carbonate is begun. The carbonate and chlorine are added at rates and in a ratio such that the pH rises rapidly toward a value near 3 and is maintained near that value when the peak input of the carbonate and chlorine has been reached. This pH is maintained during the precipitation of the greater portion of the cobalt (part BC of the diagram). The rates of addition of the carbonate and chlorine depend upon the concentration of the solution and the efficacy of the chlorine diffusion. The ratio of the additions of carbonate and chlorine must be closely controlled to attain and maintain the proper pH. Toward the end of the reaction, a rapid rise of the pH is noted (part CD of the diagram), corresponding to the depletion of cobalt in the solution. The cobalt separation is practically complete when the pH is near 4. When this value is reached, the addition of the carbonate and chlorine is stopped. There are less than a few milligrams of cobalt salt per liter left in the solution, corresponding to a precipitation of the cobalt of about 99.8%. The variation of the pH at the end of the reaction is sufficiently great to permit the use of an entirely automatic control for the complete operation. The precipitated cobaltic hydroxide is rapidly separated from the solution and washed immediately with ordinary or purified water to eliminate all of the soluble nickel. The finished cobaltic hydroxide contains less than 0.2 part of nickel for 100 parts of cobalt.

It has been previously noted, that the newly precipitated cobaltic hydroxide can absorb nickel if it is left in prolonged contact with a pure solution of nickel salts. This absorption can be avoided by maintaining the pH sufficiently low; one of the consequences of this is that the formation of cobalt peroxide, $CoO_2$, is somewhat limited. Rapidly separating the precipitate of cobaltic hydroxide from the nickel solution also prevents the absorption.

In the course of the precipitation, both reagents, chlorine and carbonate, are simultaneously added, but their respective additions are so controlled that the conditions of the reaction can be maintained or changed at any moment by merely modifying the ratio of chlorine to carbonate.

The selection of the carbonates for the process depends upon the nature of the treated salts of cobalt and nickel and generally a carbonate is used which does not give a precipitate with the anion of the salts of cobalt and nickel. The precipitates of cobaltic hydroxide obtained by using carbonates are distinguished by their less colloidal structure and ease of separation from the motherwater as compared to the precipitates obtained by using the hydroxides corresponding to the carbonates. The former are also more sensitive to the phenomena of oxidation or reduction upon which the separation depends and they are washed more easily.

It has been noted that, in the course of the precipitation of a mixed solution of cobalt and nickel salts, the hydroxides of the type $Me_2O_3 nH_2O$ are formed in a greater part. However, oxides of the type $MeO_2$ and $Me_3O_4$ may appear. If the conditions, as specified, are not complied with, these parasitic oxides would have an unfavorable effect upon the quality of the separation of cobalt and nickel.

The process according to the invention can, for example, be carried out with the apparatus represented in Figure 2, if sodium carbonate is used.

The sodium carbonate is dissolved in a tank 1 provided with a stirring device. The gaseous chlorine comes from a tank 2. The precipitation of cobalt hydroxide is conducted in a tank 3 provided with a device insuring a thorough agitation. The chlorine is introduced into the reaction tank by means of two tubes, 4 and 5, provided with porous ends to insure a good diffusion. The measurement of the chlorine input rate is made with a flowmeter 6. The solution of sodium carbonate is distributed over the surface of the solution contained in the tank by means of tubes 7 and 8 which are provided with dispersion devices. The input rate of this solution is likewise measured by another flowmeter 9. The pH measurements are made by means of a chain of glass-saturated calomel electrodes 10 immersed in a measurement cell 11, which is constantly supplied by means of an auxiliary pump 12 with solution from the tank 5, and thus a continuous control of the pH is insured. The electrodes are connected to an amplifying and recording device 13. After the cobalt has precipitated, the suspension is rapidly sent to the filter 14 in order to separate the cobaltic hydroxide from the nickel salt solution. The cake on the filter is then washed with purified water.

*Example*

An industrial solution of 1000 liters of cobaltous chloride and nickelous chloride containing $CoCl_2=110.16$ grams per liter and $NiCl_2=27.60$ grams per liter was placed in a reactor. The solution had been previously cleared of iron, copper, manganese and sulphate. The solution contained 50 kilograms of cobalt and 12½ kilograms of nickel.

The pH of the solution was brought to a value of 2 initially by diffusing chlorine into the solution at a low rate while the solution was at room temperature. Then, addition of sodium carbonate was begun and the addition of chlorine continued to rapidly bring the pH of the solution to a value near 3. Chlorine was diffused into the solution at an average rate of 75 kilograms per hour and a 20% solution of sodium carbonate was added simultaneously at the rate of 875 liters per hour to maintain the pH of the solution at a value near 3. These operations lasted about one hour and the ultimate pH reached at the end of the operation was about 4.

At this time, the addition of the chlorine and carbonate was stopped. The cobaltic hydroxide obtained was separated by filtration and the cake was washed with purified water until the last traces of nickel disappeared from the wash water. The volume of nickel chloride solution at this time was about 2600 liters. The cobalt content of the combined filtrate and wash water was about 0.04 gram per liter and, thus, 0.104 kilogram of cobalt remained in the solution. 99.792% of the cobalt had been separated from the solution.

The cobaltic oxide, after drying at 200°, contains: $Co=63.0\%$, $Ni=0.12\%$, $Fe=0.004\%$, $Cu=0.003\%$, $Mn=0.02\%$, $Ca=0.003\%$, $SiO_2=0.001\%$, $SO_4=0.002\%$, and $Cl_2=0.006\%$ While we have described a present preferred embodiment of our invention, it is to be understood that it may be otherwise embodied within the scope of the following claim.

We claim:

A one-stage process of separating cobalt and nickel values from a solution of their salts, which consists substantially of simultaneously adding chlorine and a material from a group consisting of alkali metal and alkaline-earth metal carbonates to the solution in a ratio sufficient to maintain the pH initially between about 2 and 3 and to progressively increase the pH to about 4, during which time more than 98% of the cobalt contained in the solution is precipitated as a hydroxide and the nickel remains in solution, and rapidly separating the substantially pure precipitated cobalt hydroxide from the solution to prevent absorption of nickel.

References Cited in the file of this patent
UNITED STATES PATENTS

| | | |
|---|---|---|
| 2,377,832 | Wallis | June 5, 1945 |
| 2,488,561 | Schaal | Nov. 22, 1949 |
| 2,711,956 | Schaufelberger | June 28, 1955 |
| 2,726,144 | Wallis et al. | Dec. 6, 1955 |
| 2,735,760 | Allen et al. | Feb. 21, 1956 |